Patented Oct. 10, 1939

2,175,716

UNITED STATES PATENT OFFICE 2,175,716

CHROMABLE DYESTUFFS OF THE TRIARYLMETHANE SERIES AND PROCESS OF PREPARING THEM

Wilhelm Eckert and Karl Schilling, Frankfort-on-the-Main-Hochst, Germany, assignors to General Aniline Works, Inc., New York, N. Y., a corporation of Delaware No Drawing. Application July 27, 1937, Serial No. 156,030. In Germany August 11, 1936

8 Claims. (Cl. 260—152)

The present invention relates to chromable dyestuffs of the triarylmethane series and to a process of preparing them.

We have found that very fast dyestuffs of the triarylmethane series capable of being chromed are obtainable by causing an N-substituted 2-(4'-amino-2'-hydroxy)-benzoyl-carboxy-hydroxy-1-benzoic acid, which contains the hydroxy and carboxy groups in adjacent positions, to react with a compound of the following general constitution:

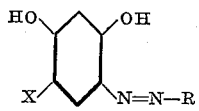

wherein X means a reactive hydrogen atom and R represents the residue of a diazotizable arylamine of the benzene and naphthalene series. This aryl radical may contain, for instance, substituents rendering the products soluble in water and also further groups capable of being chromed; or it may contain a hydroxy- or alkoxy-group standing in ortho-position to the azo-group.

The condensation is advantageously conducted by heating the reaction components at about 60° C. to about 95° C. for some hours in concentrated sulfuric acid whereby, in some cases, besides the condensation also sulfonation of the products occurs. When other condensing agents are used, for instance, para-toluene-sulfonic acid or methyl-sulfuric acid, condensation without sulfonation takes place.

The new dyestuffs obtained dye the animal fiber from an acid bath orange to blue tints. By after-chroming the fastness properties are essentially enhanced. The dyestuffs are also suitable for chrome-printing on cotton, artificial silk and so on may also be chromed in substance whereby they are transformed into the corresponding chromium complex compounds. These complex salts dye the fiber from an acid bath very clear tints which, without after-chroming, possess very good fastness properties. The dyestuffs obtainable according to the present process are new. There are, for instance, obtained dyestuffs of the following general formula:

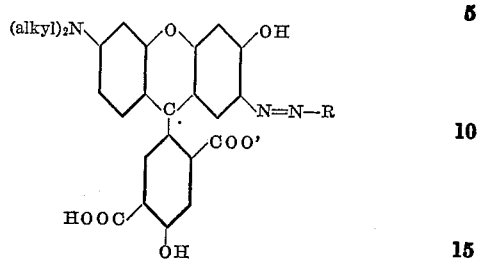

wherein R means the residue of a diazotizable arylamine of the benzene and naphthalene series. It is not known with certainty, whether the hydroxyl- and carboxyl groups, standing in ortho-position to each other in the benzene nucleus of the formula, in fact occupy the positions indicated in this formula. The hydroxy-trimellitic acid may also react with the N-substituted meta-aminophenol in a manner different from that supposed and there may thus be formed isomeric compounds wherein the hydroxyl- and carboxyl-groups standing in ortho-position to each other have exchanged their places. The products may also be mixtures of isomerides.

The following examples serve to illustrate the invention, but they are not intended to limit it thereto; the parts are by weight, unless otherwise stated:

1. Into 270 parts of concentrated sulfuric acid there are introduced 27 parts of the azo-dyestuff obtainable from diazotized 1-amino-2-hydroxy-naphthalene-4-sulfonic acid and resorcinol with 26 parts of a benzoyl-benzoic acid obtainable by condensation of one mol of 5-hydroxy-trimellitic anhydride with diethylamino-meta-phenol (for instance, by melting together during several hours at about 120° C. to about 130° C. diethylamino-meta-phenol and 5-hydroxy-trimellitic anhydride) and corresponding with the following formula:

I.
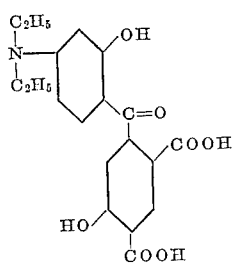

and the whole is heated for 4 to 5 hours at 60° C. to 80° C. The mass is then poured into 1000 parts of water, heated till boiling, filtered while hot and dried. The dyestuff thus obtained corresponds with the formula:

II.
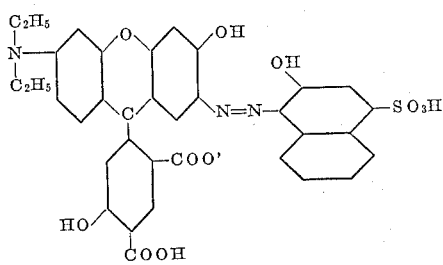

and dyes wool from an acid bath blue tints; when after-chromed, it has very good properties of fastness including fastness to light.

2. 7.4 parts of the hydrochloride of diethyl-amino-dihydroxy-carboxy-benzoylbenzoic acid (Formula I of Example 1) are dissolved with 5.6 parts of the azo-dyestuff, obtainable by coupling diazotized 1-amino-2-naphthol with resorcinol, in 40 parts by volume of concentrated sulfuric acid and the solution is heated for 4 to 5 hours at 90° C. The whole is then poured into 400 parts by volume of water, heated to boiling for a short time, filtered after cooling, washed until neutral and dried. The dyestuff transformed into the sodium salt by means of sodium carbonate dyes wool grey-blue tints and shows, when after-chromed, very good properties of fastness.

3. 6.8 parts of the hydrochloride of dimethyl-amino-dihydroxy-carboxy-benzoyl-benzoic acid obtainable by condensing 5-hydroxy-trimellitic anhydride with mata-dimethylamino-phenol at 135° C. to 140 C.) are dissolved in 40 parts by volume of concentrated sulfuric acid with 5.6 parts of the azo-dyestuff described in Example 2 and the solution is heated for 4 to 5 hours at 90° C. After pouring the whole into 400 parts by volume of water, boiling for a short time and cooling, the dyestuff is filtered with suction, washed until neutral and transformed into the sodium salt. The dyestuff possesses the same tinctorial properties as the dyestuff disclosed in Example 1.

4. 14.8 parts of the hydrochloride of diethyl-amino-dihydroxy-carboxy-benzoylbenzoic acid (Example 1) are dissolved in 40 parts by volume of concentrated sulfuric acid with 7.1 parts of the azo-dyestuff obtainable by coupling diazotized 5-sulfo-3-amino-salicylic acid of the formula:

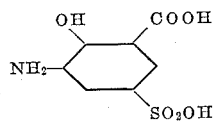

with resorcinol. The solution is heated for 4 to 5 hours at about 90° C. After diluting with 400 parts of water, boiling for a short time and adding 50 parts of sodium chloride, the dyestuff precipitates on cooling. It dyes from an acid bath red tints which, when after-chromed, become somewhat browner and whose fastness properties are thereby enhanced.

5. 7.4 parts of the hydrochloride of diethyl-amino-dihydroxy-carboxy-benzoyl-benzoic acid (Example 1) and 5.5 parts of the azo-dyestuff, obtainable by coupling diazotized para-amino-salicylic acid with resorcinol, are dissolved in 40 parts by volume of concentrated sulfuric acid and then heated at about 90° C. for 4 to 5 hours. When worked up as indicated in Example 2, a dyestuff is obtained which yields in an acid bath vivid brown dyeings which when after-chromed become somewhat redder and whose fastness properties are thereby enhanced.

6. 6.8 parts of the hydrochloride of dimethyl-amino-dihydroxy-carboxy-benzoyl-benzoic acid (Example 3) and 5.5 parts of the azo- dyestuff made from diazotized para-amino-salicylic acid and resorcinol are condensed in 40 parts by volume of sulfuric acid for 4 to 5 hours at about 90° C. A dyestuff is obtained which has properties similar to those of the dyestuff obtained in Example 5.

7. 7.4 parts of the hydrochloride of diethyl-amino-dihydroxy-carboxy-benzoylbenzoic acid (Example 1) and 4.3 parts of the azo-dyestuff obtainable by coupling diazotized ortho-amino-phenol with resorcinol, are condensed in 40 parts by volume of concentrated sulfuric acid for 4 to 5 hours at 90° C. A dyestuff is obtained which dyes from an acid bath a dull violet which when after-chromed becomes somewhat redder and whose fastness properties are thereby enhanced.

8. 7.4 parts of the hydrochloride of diethyl-amino-dihydroxy-carboxy-benzoylbenzoic acid (Example 1) and 4.3 parts of the azo-dyestuff obtainable by coupling diazotized ortho-anisidine with resorcinol, are heated in 40 parts by volume of concentrated sulfuric acid for 4 to 5 hours at 90° C. After adding 400 parts of water and heating for a short time a dyestuff is obtained which after cooling, is filtered with suction, washed until neutral and transformed into the sodium salt. It dyes from an acid bath a dull red which, when after-chromed, becomes somewhat bluer and faster.

9. 4.1 parts of the hydrochloride of diethyami-no-dihydroxy-carboxy-benzoylbenzoic acid (Example 1) and 2.8 parts of the dyestuff made from diazotized 1-amino-2-naphthol and resorcinol are dissolved in 80 parts of molten para-toluene-sulfonic acid and then heated for 5 hours at 95° C. The whole is poured, while hot, into 400 parts by volume of water. The dyestuff is filtered with suction, dissolved in hot sodium carbonate solution and separated from small traces of para-toluene-sulfonic acid which is difficultly soluble in the form of its sodium salt. The solution is rendered acid to Congo paper, the dyestuff is filtered with suction, washed until neutral, dried and transformed with the calculated amount of sodium carbonate into the easily soluble sodium salt. The dyestuff yields from an acid bath on after-chroming a grey-blue of good properties of fastness, similar to that obtained in Example 2. By using methyl-sulfuric acid instead of para-toluene-sulfonic acid, the same dyestuff is obtained.

10. 3.82 parts of the hydrochloride of dimethyl-amino-dihydroxy-carboxy-benzoyl-benzoic acid (Example 3) are condensed with 2.8 parts of the azo-dyestuff made from diazotized 1-amino-2-naphthol and resorcinol in 80 parts of para-toluene-sulfonic acid at 95° C. After worked up as described in Example 2, a dyestuff is obtained whose properties are very similar to those of the dyestuff obtained in Example 9.

11. 3.3 parts of the azo-dyestuff made from diazotized 1-amino-2-hydroxy-3-naphthoic acid and resorcinol (prepared according to "Berichte der Deutschen Chemischen Gesellschaft," vol. 58, page 2555) and 4.2 parts of diethylamino-dihydroxy-carboxy-benzoylbenzoic acid (Example 1) are condensed in 50 parts of para-toluene-sulfonic acid for 4 to 5 hours at 95° C. and the whole is worked up as described in Example 10. The after-chromed dyeing is a greenish blue of very good fastness properties.

We claim:

1. The compounds of the general formula:

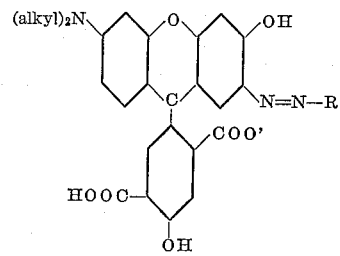

wherein R means the residue of a diazotizable arylamine of the benzene and naphthalene series and alkyl means a member of the group consisting of methyl and ethyl, being chromable dyestuffs of excellent fasteness properties.

2. The compound of the formula:

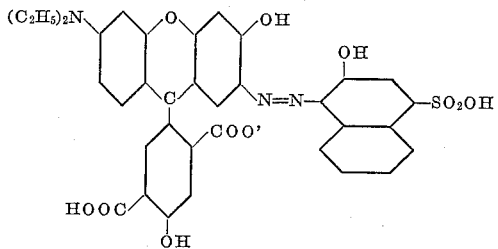

being a dyestuff which dyes wool from an acid bath blue tints; when after-chromed it has very good properties of fastness including fastness to light.

3. The compound of the formula:

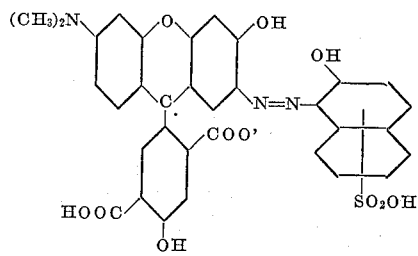

being a dyestuff which dies wool from an acid bath blue tints; when after-chromed, it has very good properties of fastness including fastness to light.

4. The compound of the formula:

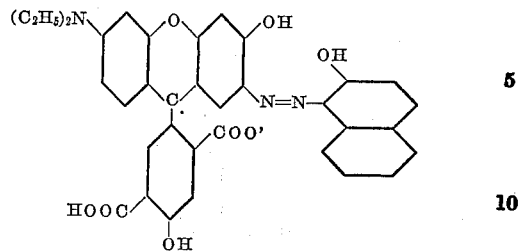

being a dyestuff which yields when after-chromed a grey-blue of good properties of fastness.

5. The process which comprises causing a benzoylbenzoic acid of the general formula:

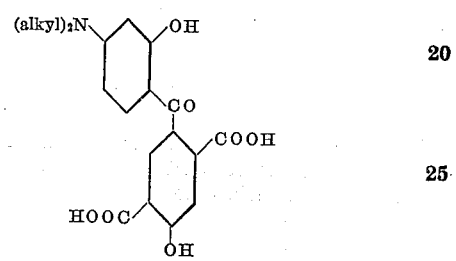

wherein alkyl means a member of the group consisting of methyl and ethyl, to react with a compound of the general formula:

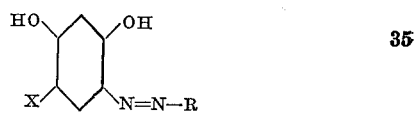

wherein X represents a reactive hydrogen atom and R represents the residue of a diazotizable arylamine of the benzene and naphthalene series, by heating at a temperature of between about 60° C. and about 95° C. the reagents in the presence of an agent of the group consisting of concentrated sulfuric acid, para-toluene sulfonic acid and methyl-sulfuric acid.

6. The process which comprises causing a benzoylbenzoic acid of the formula:

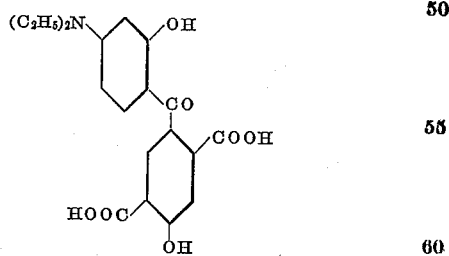

to react with a compound of the formula:

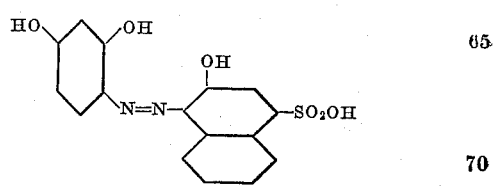

by heating at a temperature of about 60° C. to about 80° C. for some hours the reagents in the presence of concentrated sulfuric acid.

7. The process which comprises causing a benzoylbenzoic acid of the formula:

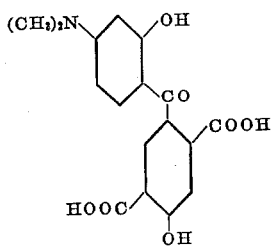

to react with a compound of the formula:

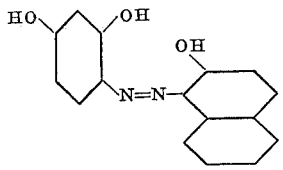

by heating at a temperature of about 90° C. for some hours the reagents in the presence of concentrated sulfuric acid.

8. The process which comprises causing a benzoylbenzoic acid of the formula:

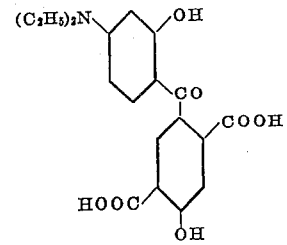

to react with a compound of the formula:

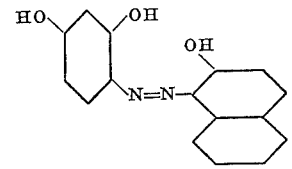

by heating at a temperature of about 95° C. for some hours the reagents in the presence of para-toluene sulfonic acid.

WILHELM ECKERT.
KARL SCHILLING.